United States Patent [19]
Fisher

[11] Patent Number: 6,106,079
[45] Date of Patent: Aug. 22, 2000

[54] BRAKE SYSTEM VALVE HAVING AN ANTI-COMPOUNDING FEATURE

[75] Inventor: Albert D. Fisher, La Harpe, Kans.

[73] Assignee: Haldex Brake Corporation, Kansas City, Mo.

[21] Appl. No.: 09/109,411

[22] Filed: Jun. 30, 1998

[51] Int. Cl.[7] .................................................. B60T 15/18
[52] U.S. Cl. ........................... 303/28; 303/9.76; 303/71; 303/84.1; 303/9
[58] Field of Search ................... 303/13, 28, 29, 303/30, 9.76, 71, 7, 9, 84.1, 84.2; 188/170; 137/102

[56] References Cited

U.S. PATENT DOCUMENTS 3,413,040  11/1968  Horowitz ................................. 303/29
3,862,782  1/1975  Horowitz et al. ........................ 303/9
3,863,992  2/1975  Kurake et al. ........................... 303/9

Primary Examiner—Douglas C. Butler
Attorney, Agent, or Firm—St. Onge Steward Johnston & Reens LLC

[57] ABSTRACT

A brake system valve having an anti-compounding feature is provided, comprising: a brake housing; a vent port in the housing; first and second control ports in the housing; a piston mounted within the housing, the piston having a passage connecting the vent port in fluid communication with the first control port when the piston is in a first position, the piston moveable to a second position to seal the vent within the housing.

17 Claims, 3 Drawing Sheets

BRAKE SYSTEM VALVE HAVING AN ANTI-COMPOUNDING FEATURE

FIELD OF THE INVENTION

The invention relates to valves which prevent compounding in a braking system for heavy-duty vehicles.

BACKGROUND OF THE INVENTION

Compounding is a problem with braking systems for heavy-duty vehicles that can occur when a driver applies the service brakes and the emergency brake is already engaged. If the combined service and emergency forces on the brakes are too great, damage can occur to the brakes. This situation occurs when the emergency air is exhausted, which activates the emergency brake, and at the same time the service air is pressurized which would activate the service brake and apply excessive force in the absence of an anti-compounding feature. Anti-compounding devices are used so that when the service brake is attempted to be applied while the emergency brake is on, the service air is exhausted so the service brakes become inactive to prevent the combined forces from damaging the brake system.

The Midland N-30162 series tractor protection valve is a prior art anti-compounding device that employs a one way check valve disk. When the emergency air cavity is pressurized thus preventing the emergency brake from engaging, the check valve disk seals off the service air and prevents it from flowing into the emergency air cavity. When the emergency air cavity is exhausted thus activating the emergency brake, the check valve disk allows the service air to bleed into the emergency air cavity preventing the service air from becoming pressurized and the service brake from being applied in addition to the emergency brake. A disadvantage of this device is that for proper functioning of the check disk valve, the size of the hole between the emergency air cavity and the service air cavity must be tightly controlled. Otherwise, if too much service air can bleed to the emergency cavity when the emergency spring brake is on, it may undesirably cycle the piston in the valve allowing service air to flow through thereby defeating the anti-compounding feature.

U.S. Pat. No. 5,172,958 to Sell discloses an anti-compounding feature for an air brake control valve system that uses a slide valve/piston which exhausts the service brake line to the atmosphere whenever the emergency supply air has been interrupted due to the application of the tractor's spring brakes. The Sell control valve housing also performs other functions, such as controlling pressure to the spring brakes and filling and protecting the pressure in the air reservoir tank. Disadvantageously, these extra functions can make the Sell control valve more expensive to manufacture and can create a higher risk of part failure.

U.S. Pat. No. 4,407,548 to Graham discloses the use of a safety valve including a spring to eliminate undesirable compounding.

What is desired, therefore, is an anti-compounding device for brakes that does not leak service control air into the emergency air cavity when the emergency brake is activated, that does not require a check valve fitted to a hole having a strict size tolerance, and that is reliable and uses a fewer number of parts than previous anti-compounding devices.

SUMMARY OF THE INVENTION

Accordingly, an object of the present invention is to provide a brake system valve having an anti-compounding feature that does not leak service control air into the emergency air cavity when the emergency brake is activated.

It is another object of the invention to provide a brake system valve having an anti-compounding feature of the above type that is mechanically reliable and requires a small number of parts.

It is a further object of the invention to provide a brake system valve having an anti-compounding feature of the above type using O-rings seals to prevent the emergency air cavity and service control air cavity from undesirably exhausting.

It is yet another object of the invention to provide brake system valve having an anti-compounding feature of the above type using a piston that is moved by the air from the emergency air cavity.

It is still another object of the invention to provide brake system valve having an anti-compounding feature of the above type wherein the service control air cavity can be exhausted through the piston.

These objects of the invention are achieved by a brake valve having an anti-compounding feature, comprising: a brake housing; a vent port in the housing; first and second control ports in the housing; a piston mounted within the housing, the piston having a passage connecting the vent port in fluid communication with the first control port when the piston is in a first position, the piston moveable to a second position to seal the vent within the housing.

DETAILED DESCRIPTION OF THE INVENTION

Figure 1A:
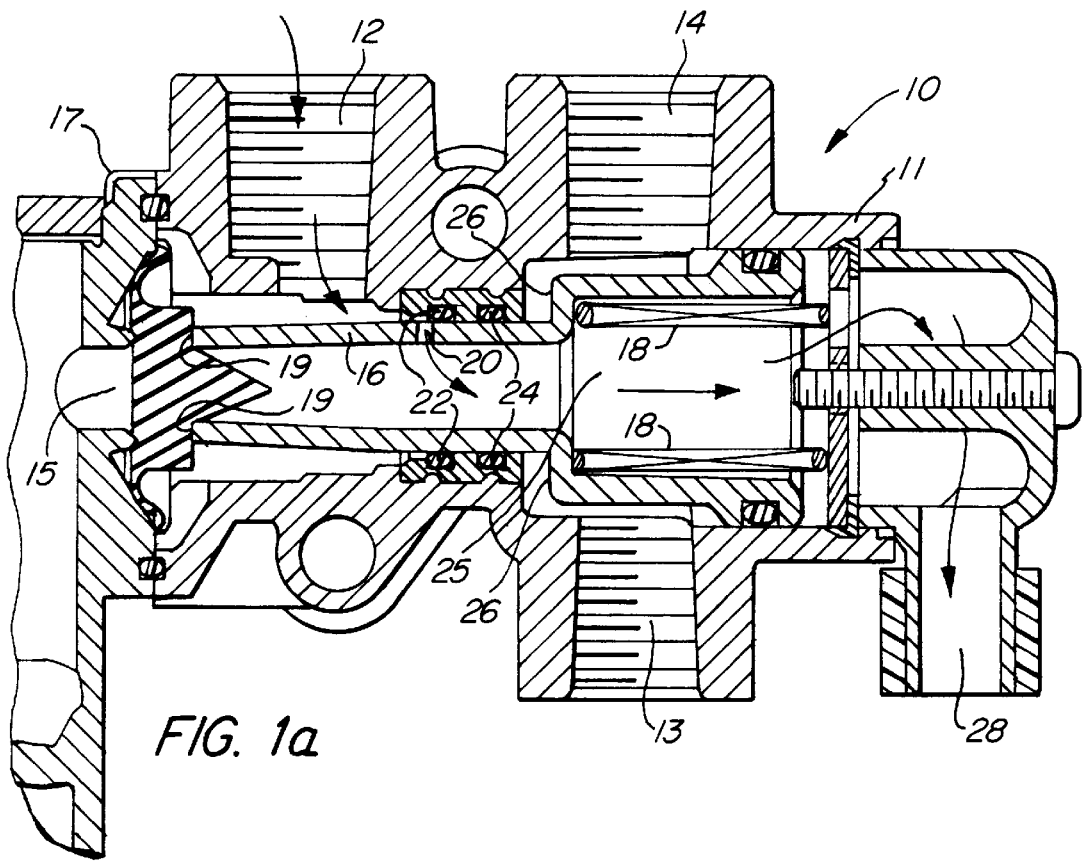
FIGS. 1a and 1b are a cross sectional view and an enlarged cross sectional view respectively of the brake system valve of the present invention with the piston in the anti-compounding position.
Figure 1B:
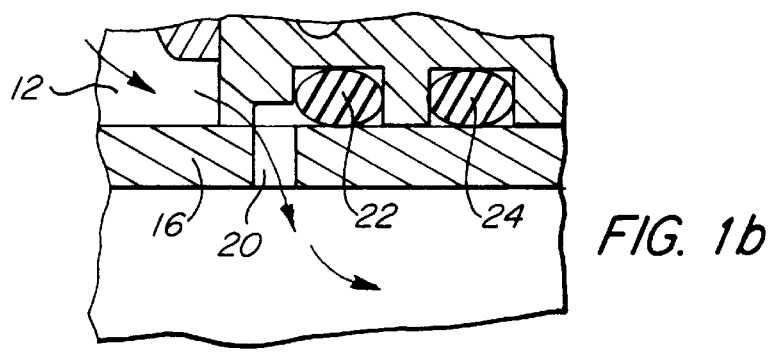

A brake system valve 10 having an anti-compounding feature is shown in FIGS. 1 and 2. The brake valve comprises a housing 11 having a service control port 15, a service control delivery port 12, an emergency air port 13, an emergency air delivery port 14, a piston 16 having a hole 20, first 22 and second 24 O-rings and a housing vent 28. The emergency air port 13 is always in fluid communication with the emergency air delivery port 14.

The emergency air delivery port 14 controls whether or not the emergency brake 35 is activated and supplies air to the reservoirs on a trailer which are used for trailer service and emergency brakes. When the emergency air delivery port 14 is not pressurized with enough air to inactivate the emergency brake 35, at least one spring 18 biases the piston 16 to the first position shown in FIGS. 1a and 1b. In the first position, the service brake is inoperated by sealing off the service control port from the service control delivery port 12 by the spring 18 biasing the piston 16 against a seal 19 and piston seat in the manifold 17. Also, in the first position, the air from the service control delivery port 12 vents to the atmosphere by traveling through a hole 20 in the piston 16, through a cavity 25 of the piston 16, and through a housing vent 28 which vents to atmosphere.

Figure 2A:
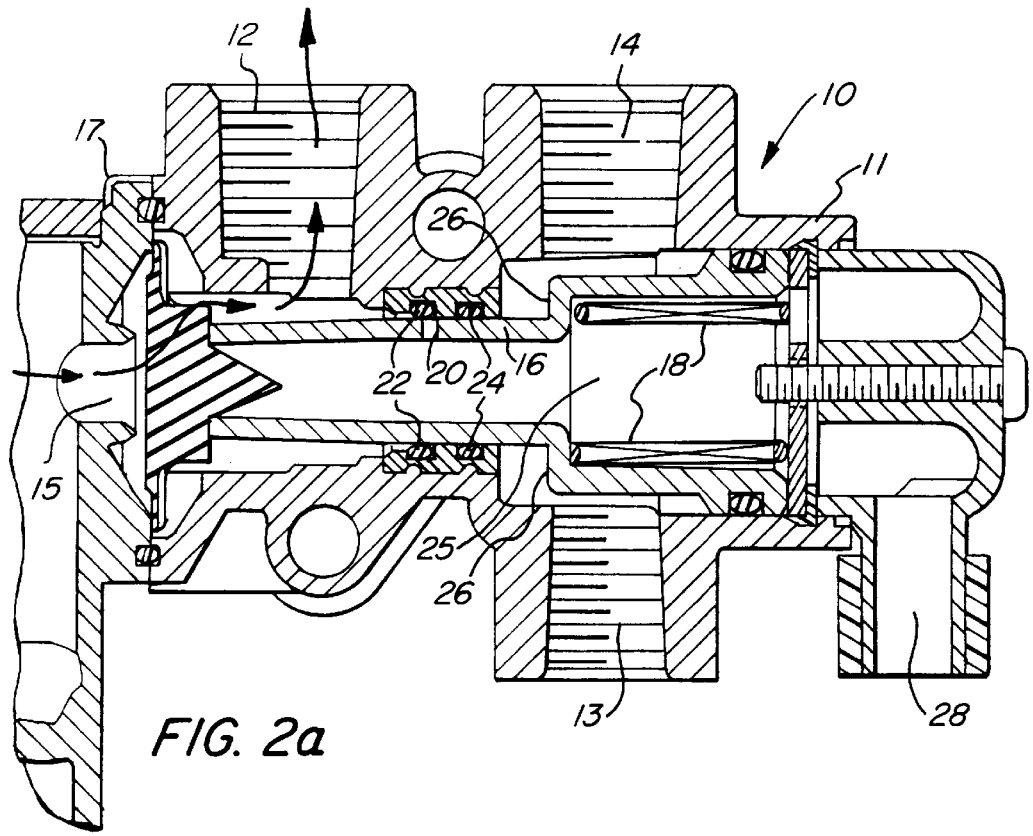
FIGS. 2a and 2b are a cross sectional view and an enlarged cross sectional view respectively of the brake system valve of FIGS. 1a and 1b with the piston in the non anti-compounding position.
Figure 2B:
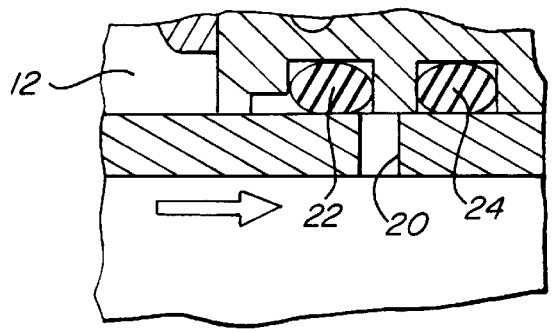

When the emergency air delivery port 14 is pressurized with enough air to inactivate the emergency brake 35, the emergency air pressure moves the piston 16 to the second position as shown in FIGS. 2a and 2b by making contact with the piston surface 26. In the second position, the air in the service control delivery port 12 is in communication with the service control port 15 and is not in communication with the piston hole 20, the piston cavity 25 or the housing vent 28 and therefore cannot vent to the atmosphere. In the second position, the service control delivery port 12 is prevented from being in communication with the hole 20 by an O-ring 22 which encircles the piston 16. A second O-ring 24 which also encircles the piston 16 prevents the hole 20 from being in communication with the emergency air delivery port 14 whether the piston 16 is in the first or second position.

The piston 16 is only required to have a cavity 25 sufficient to allow the service control air to vent to atmosphere. The piston 16 may be substantially hollow.

Figure 3:
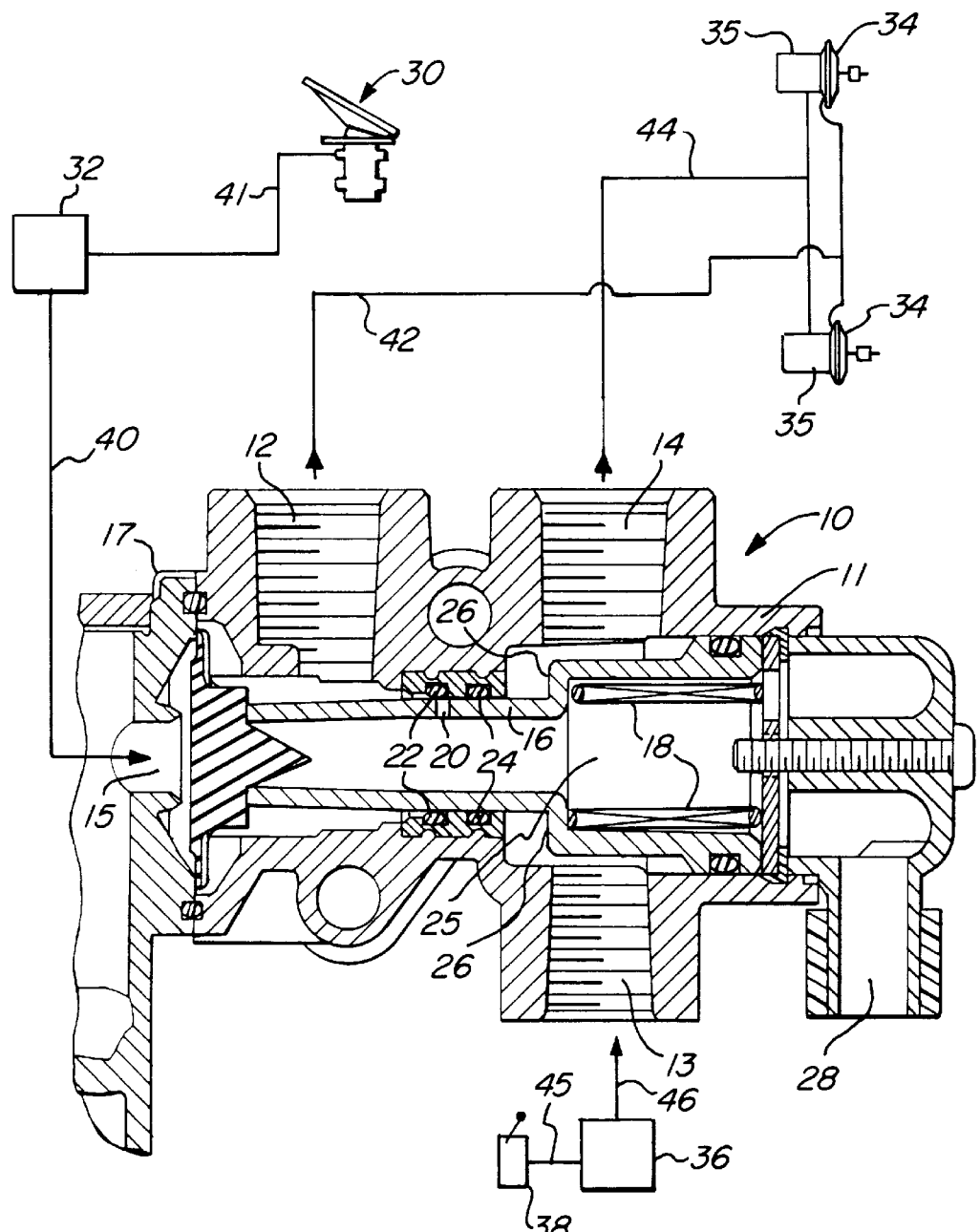
FIG. 3 is a cross sectional view of a service brake and an emergency brake used with the brake system valve of FIGS. 1a and 1b with the piston in the non anti-compounding position.

Referring to FIG. 3, a service brake pedal 30 is connected through service brake line 41 to a first device 32 for regulating the service control air pressure through service brake line 40 which is connected to the service control port 15. The service control delivery air activates the service brakes 34 through service brake line 42. When the service brake pedal 30 is depressed and the emergency brakes 35 are off, the first device 32 increases the service control air pressure and applies the service brakes 34 proportionally in response to the amount the service brake pedal 30 has been depressed. The service brakes 34 are inactivated when the emergency brakes 35 are on.

An emergency brake activator 38 is connected through emergency brake line 45 to a second device 36 which is connected to the emergency air port 13 through brake line 46. The emergency air delivery port 14 activates the emergency brakes 35 through emergency brake line 44. The emergency brake activator 38 can be any type of an on/off device such as a switch or a push button. When the emergency brake activator 38 is in the off position, the second device 36 disengages the emergency brakes 35 by heightening the emergency air pressure. When the emergency brake activator 38 is in the on position, the second device 36 engages the emergency brakes 35 by lowering the emergency air pressure.

The service brake lines 40 and 42 may be connected together or separated. Similarly, the emergency brake lines 44 and 46 may be connected together or separated.

In operation, when the emergency brakes 35 are on, the emergency air pressure is low, the service control delivery air vents to the atmosphere, and the service brakes 34 are inactivated. When the emergency brakes 35 are off, the emergency air pressure is high, the service control delivery air cannot vent to the atmosphere, and the service brakes 34 can be activated by the driver of the vehicle. Accordingly, when the emergency brakes 35 are off, the service brakes 34 can be activated and when the emergency brakes 35 are on, the service brakes 34 are inactivated thus preventing the compounding of the emergency and service brake forces simultaneously.

The above anti-compounding feature can apply to braking systems having only one emergency brake 35 or two or more.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

I claim:

1. A brake system valve having an anti-compounding feature, comprising:

a brake housing;

a vent port in said housing;

a first delivery port in said housing in fluid communication with a first brake mechanism;

a second delivery port in said housing in fluid communication with a second brake mechanism and with a second air source;

a piston mounted within said housing, said piston having a passage connecting said vent port in fluid communication with said first delivery port when said piston is in a first position, said piston moveable to a second position to seal said vent from said first delivery port and to place said first delivery port in fluid communication with a first air source, said piston movable between the first position and the second position in response to air pressure in said second delivery port.

2. The brake system valve according to claim 1, wherein air pressure in said second delivery port moves said piston to the second position to seal said vent from said first delivery port.

3. The brake system valve according to claim 1, wherein the passage in said piston comprises a cavity.

4. The brake system valve according to claim 3, wherein said piston is substantially hollow.

5. The brake system valve according to claim 3, wherein the passage also comprises a hole in a wall of said piston in fluid communication with the cavity.

6. The brake system valve according to claim 5, wherein said housing includes a pair of O-rings and wherein the hole in the piston wall is sealed between the O-rings when said piston is in the second position.

7. The brake system valve according to claim 1, wherein said piston is spring biased to the first position.

8. A brake system having an anti-compounding brake system valve, comprising:

a service brake;

a service brake pedal for activating the service brake;

an emergency brake;

an emergency brake activator for activating the emergency brake;

a brake housing;

a vent port in said housing;

a service control delivery port and an emergency control port in said housing;

a piston mounted within said housing, said piston having a passage connecting said vent port in fluid communication with said service control delivery port when said piston is in a first position, said piston moveable to a second position to seal said vent from said service control delivery port.

9. The brake system according to claim 8, wherein activation of the emergency brake activator creates a low emergency air pressure in said emergency control port and said piston remains in the first position and wherein inactivation of the emergency brake activator creates a high emergency air pressure in said emergency control port and said piston moves to the second position.

10. The brake system according to claim 9, wherein the high emergency air pressure in said emergency control port moves said piston to the second position to seal said vent from said service control delivery port.

11. The brake system according to claim 8, wherein said service brake is inactivated when said piston is in the first position.

12. The brake system according to claim 8, wherein the passage in said piston comprises a cavity.

13. The brake system according to claim 12, wherein said piston is substantially hollow.

14. The brake system according to claim 12, wherein the passage also comprises a hole in a wall of said piston in fluid communication with the cavity.

15. The brake system according to claim 14, wherein said housing includes a pair of O-rings and wherein the hole in the piston wall is sealed between the O-rings when said piston is in the second position.

16. The brake system according to claim 8, wherein said piston is spring biased to the first position.

17. The brake system according to claim 8, further comprising a service control port being in fluid communication with said service control delivery port when said piston remains in the second position, said service control port being sealed from said service control delivery port when said piston remains in the first position.

* * * * *